Figure 1:
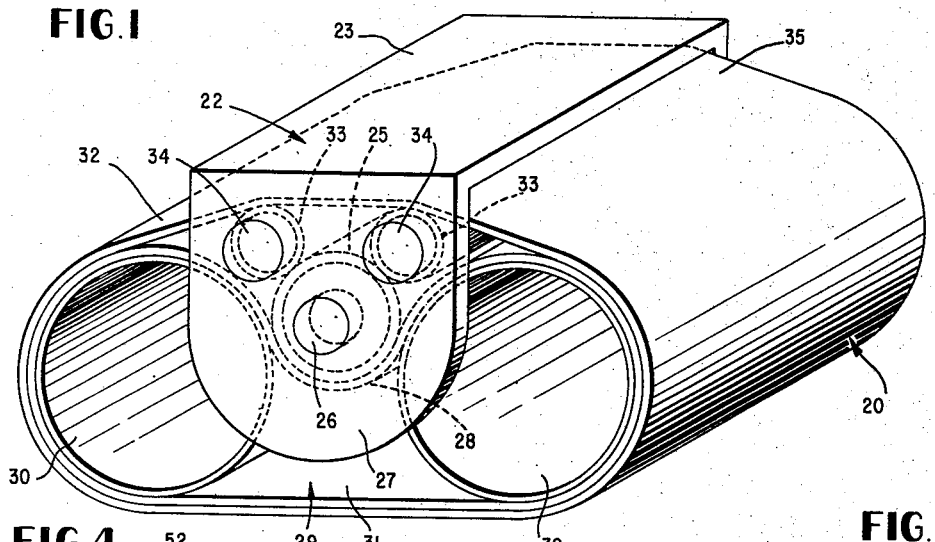

INVENTOR.
WALTON W. CUSHMAN

Oct. 22, 1963  W. W. CUSHMAN  3,107,924
LOAD-BEARING AND TRANSPORTING MEANS CONSTITUTING
WHEEL AND ENDLESS TRACK SUBSTITUTE
Filed June 22, 1962  2 Sheets-Sheet 2
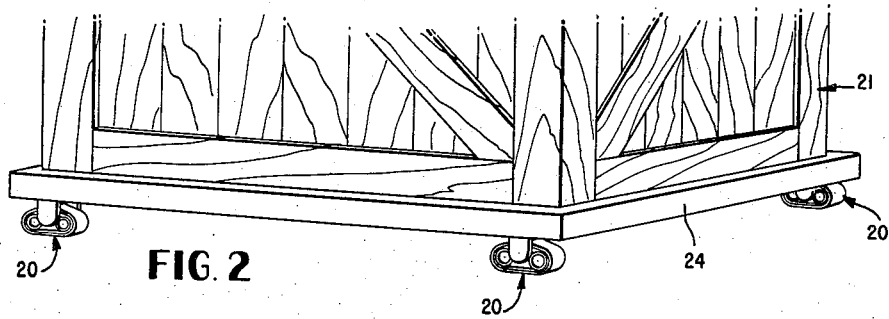
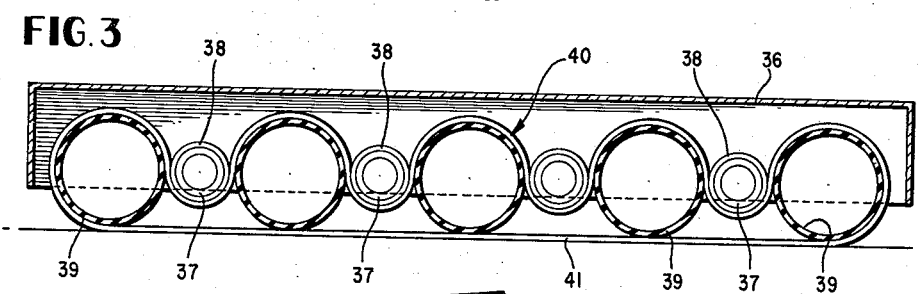
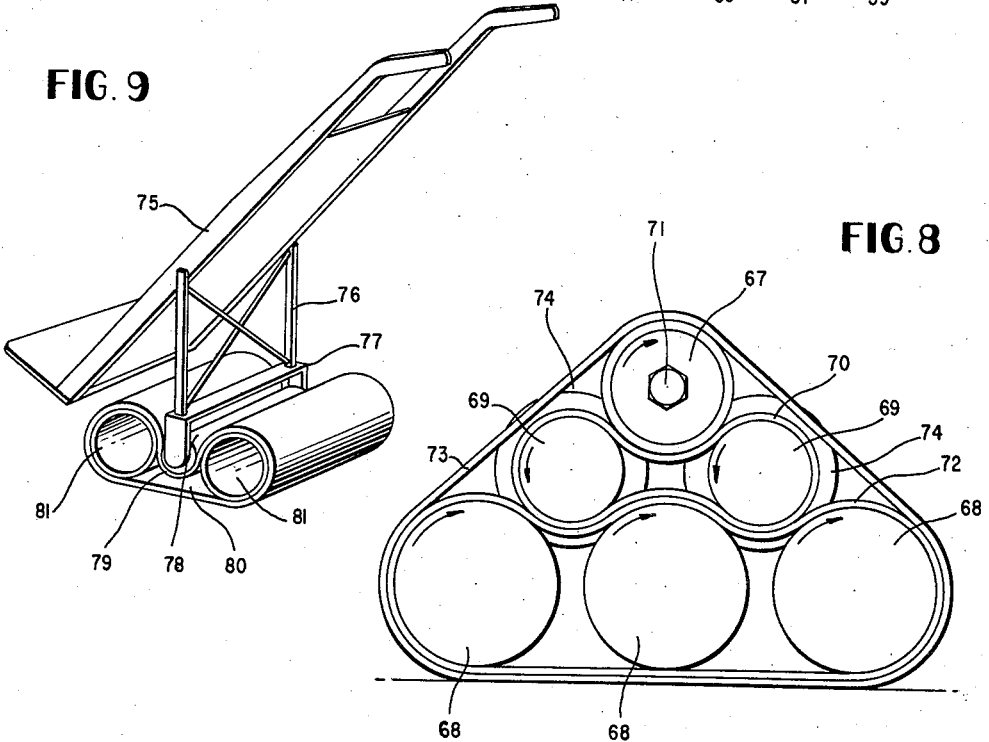
INVENTOR.
WALTON W. CUSHMAN
BY
ATTORNEY United States Patent Office 3,107,924
Patented Oct. 22, 1963

3,107,924
LOAD-BEARING AND TRANSPORTING MEANS CONSTITUTING WHEEL AND ENDLESS TRACK SUBSTITUTE
Walton W. Cushman, 401 N. Penn St., Webb City, Mo.
Filed June 22, 1962, Ser. No. 204,390
16 Claims. (Cl. 280—28.5)

This invention relates to load-bearing, transporting and traction means and more particularly to such means constituting a substitute for pneumatic tired wheels and conventional endless track means in vehiclar suspension systems and the like.

The prime object of the invention is to provide a vehicular support means which possesses substantially all of the advantages of pneumatic tired wheels and tracked vehicular load-moving and supporting means, while at the same time, eliminating substantially the well-known deficiencies of both prior art types.

Both tracked and pneumatic tired wheel vehicles, and certain variations thereof, have been usefully employed for many decades, each with its own outstanding advantages and disadvantages. In general, tracked vehicular moving and supporting means has always held the advantage of large foot-print area and low unit ground pressure. On the other hand, tracked vehicles are inherently relatively slow speed vehicles with excessive resistance to rolling, and such vehicles are commonly excessively heavy in construction with expensive and inefficient shock absorbing means where such means is employed. The pneumatic tired wheel has held the distinct advantages of reduced resistance to rolling and better adaptation to high speeds, much more simplified application to a wider variety of vehicles, etc. Pneumatic tired wheels, however, are subject to rapid wear on the tread portions thereof with no universally acceptable and inexpensive tread replacement scheme. Additionally, excessive side wall twisting in response to torque applied through pneumatic tired wheels is another factor which severely limits the performance capabilities of such wheels, as is well known. Pneumatic tired wheels have relatively high ground contact pressure and are subject to flat-spotting and they do not represent by any means the ideal solution to all ranges of load supporting and moving in self-propelled vehicles and otherwise. The present invention in its broadest aspect, as previously suggested, has all of the attributes of both mentioned prior art means plus a number of self-contained and inherent attributes which are not present in any known prior art means or system for supporting and moving loads upon a stable surface. Such attributes will be readily apparent during the course of the following detailed description.

Specific objectives of the present invention include the following:

(1) Increased foot-print area for the purpose of decreasing ground pressure without significant loss of high speed capabilities;

(2) Superior simplified efficient and self-contained shock absorbing characteristics;

(3) Decreased resistance to rolling and consequently reduced power consumption;

(4) Decreased initial and replacement costs and rapid and inexpensive tread element replacement;

(5) Greatly reduced weight as compared to prior art track-laying devices;

(6) Greatly improved overload capabilities;

(7) Increased traction over loose sand, mud, snow, ice, etc.;

(8) Complete elimination of inflation problems due to punctures, etc.; and (9) Strict compliance with dimensional limitations in applications where pneumatic tired wheels have heretofore been used.

Other objects and advantages of the invention will be apparent during the course of the following description.

Figure 4:
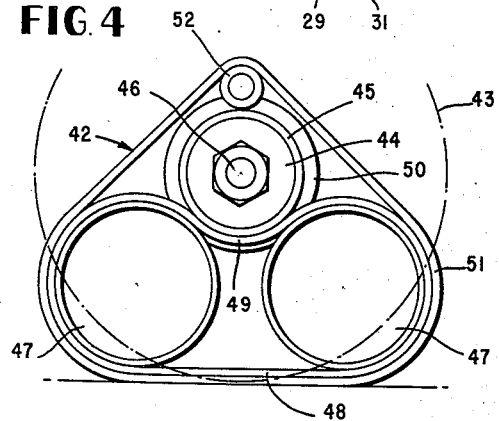
Figure 5:
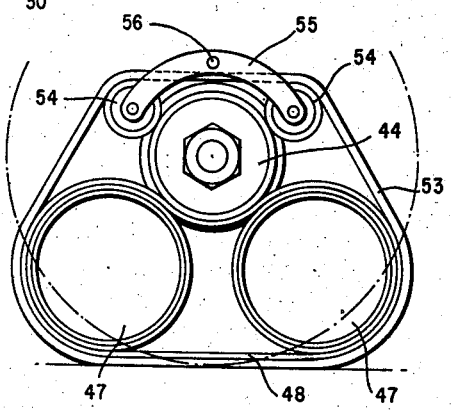
Figure 6:
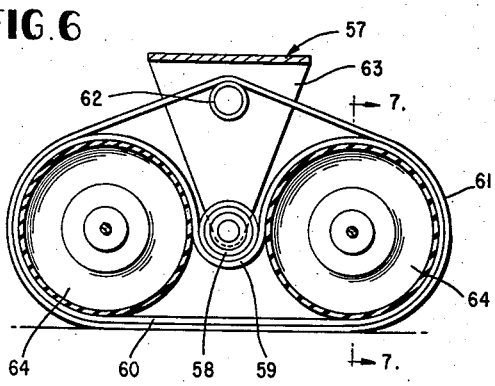
Figure 7:
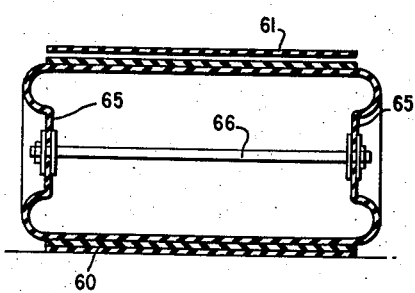

In the accompanying drawings forming a part of this application and in which like numerals are employed to designate like parts throughout the same:

FIGURE 1 is a perspective view, partly diagrammatic, of a load moving and support unit embodying principles of the invention and illustrating the adaptability of the invention to certain specific load carrying and moving requirements, FIGURE 2 is a fragmentary perspective view illustrating one application or use of the unit depicted in FIGURE 1, FIGURE 3 is a vertical sectional view through a modified type of invention unit for supporting and moving palletized loads or the like, FIGURE 4 is an end elevational view of another modified form of the invention as employed for a wheel substitute in various applications, FIGURE 5 is an end elevation of a modified form of the invention illustrated in FIGURE 4, FIGURE 6 is a similar view, partly in section, of a further modified form of the invention, FIGURE 7 is a vertical section taken on line 7—7 of FIGURE 6, FIGURE 8 is a diagrammatic end elevation showing another modified form of the invention, and FIGURE 9 is a perspective view, partly diagrammatic, showing the adaptation of the invention to a hand truck or the like.

In the drawings, wherein for the purpose of illustration are shown preferred embodiments of the invention, attention is directed first to FIGURES 1 and 2 of the drawings, wherein load support and moving units 20, each embodying the invention, are employed to support and move a warehouse cargo container 21 or the like which may weigh as much as 32,000 pounds or the like. Heretofore, such loads have been placed upon skid trucks or bases equipped at the four corners thereof with steel rollers or casters. Under such loads, the steel rollers tend to dig deeply into the warehouse or other floor, and it is very difficult to move the load 21 at all and if it is moved, the floor is severely damaged. By means of the units 20, the load 21 may be adequately supported and moved with relative ease.

Each invention unit 20 comprises a generally U-shaped attaching bracket 22 having the top wall 23 thereof suitably rigidly secured in any desired manner to the truck or platform body 24, FIGURE 2, which bears the load 21. The units 20 as shown in FIGURE 2 are secured to the platform 24 near the corners thereof so that each unit 20 may bear an equal portion of the total load. Each unit 20 further comprises a load bearing roller 25 formed of steel or the like having reduced end trunnions 26 journaled upon the depending end walls 27 of the bracket 22. The load bearing roller 25 rests directly and freely upon the upper run 28 of a flexible load-supporting belt 29 which may be formed of steel or other like material having a sufficiently high tensile strength and flexibility. In some instances, the load-bearing belt may be formed of reinforced elastomeric materials including fabric reinforced rubber. The thickness of the metal belt 29 in FIGURE 1 is exaggerated for the purpose of illustration. In practice, the metal load-bearing belt may be quite thin, such as about 15 or 20 thousandths of an inch thick. The load-bearing belt 29 engages over a pair of relatively large cylindrical tubular reaction rollers 30 formed of thin-walled steel or plastic tubing or the like and being of equal diameter. These reaction rollers 30 under load are capable of yielding slightly or becoming slightly elliptical to add further to the resiliency of the suspension unit 20, but at the same time the rollers 30 are adequately sturdy. The upper run 28 of the load-bearing belt takes on a pronounced sag between the inner sides of the reaction rollers 30, as shown, and the load-bearing roller 25 is cradled bodily within and upon the intermediate sagging portion of the upper run 28 and in peripheral contact therewith for apprximately one-half or less of the circumference of the roller 25 at the lower side thereof. Thus, the weight of the load resting upon the bracket 22 is transmitted directly to the roller 25 to the upper run 28 of the load-bearing belt 29. Unlike a conventional wheeled vehicle or track laying vehicle, there are no axles for the reaction rollers 30 and the total load is not concentrated through axles to two definite foot-prints at the bottoms of the rollers 30. In the case of conventional pneumatic tired vehicle wheels, the foot-print is always apparent at the bottoms of the wheels where the tires engage the ground if the load is concentrated through the wheel axles. This is modified with the present invention since the foot-print area is substantially increased somewhat in proportion to the softness of the terrain over which it is operated.

The load-bearing belt 29 is in fact under load tightly wrapped about almost three-quarters of the circumference of each reaction roller 30, and each reaction roller constantly exerts a radial reaction force in all radial directions against the load-bearing belt so that the total load atop the bracket 22 through the belt 29 is transmitted as a radial compressive force upon each reaction roller 30, and, as stated, the load is not concentrated at the point of ground contact at the bottom of each roller 30. The bottom run 31 of the load-bearing belt 29 is taut under load and remains flat but may yield upwardly when passing over obstructions or soft surfaces such as sand, mud, snow and the like. This basic arrangement, thus far described, constitutes the essence of the invention and is believed to be a basically new concept in load-supporting and surface locomotion technology.

A readily replaceable tread belt 32 which may be an all elastomer tread belt may be applied directly over the load-bearing belt 29 and follows the same in intimate contact therewith along the bottom run 31 and around the outer sides of the reaction rollers 30.

Relatively small tread belt snubbing rollers 33 are arranged intermediate the tops of the load-bearing roller 25 and reaction rollers 30 and have end trunnions 34 journaled within openings in the bracket end walls 27 and supported thereby. The top run 35 of the tread belt engages over the two snubbing rollers 33 as shown in the drawings and is thereby held spaced from the top of the roller 25 and the top run of the load-bearing belt. Snubbing rollers 33 may be in rolling contact with load-bearing roller 25.

The unit 20 above-described for the application shown in FIGURE 2 need be only about five inches in height and about five inches wide axially of the rollers 25 and 30. A unit of this approximate size can readily bear an 8,000 pound load and offers relatively small resistance to rolling when the load 21 is to be moved in a warehouse or the like. The unit 20 can be made in various sizes for various applications or uses, all within the scope of the invention. While the unit 20 shown in FIGURES 1 and 2 is an unpowered unit to facilitate supporting and moving the load 21, it should be understood that the load-bearing roller 25 may be a powered roller, rendering the unit 20 self-propelling. The metal rollers 25 and 30 may have their peripheries lagged with rubber or the like to increase traction between them and the belt 29. If desired, instead of the metal rollers 30 shown and described above, inflated reaction rollers formed of reinforced elastometric material may be employed to render the device even further resilient for different applications than that shown in FIGURE 2. In any such case, the rollers 30 will have no axles and the load will be bourne by the unit 20 in the same manner above-described.

Another feature of the unit 20 resides in the walking-beam principle which is inherent in the construction with the load bearing roller 25 cradled midway between the parallel axes of the reaction rollers 30. When the unit meets obstructions in the ground, depending upon its direction of travel, one or the other of the rollers 30 will tend to "walk over" the obstruction with a pivoting action about the axis of the roller 25. In powered units, the direction of rotation of the powered roller 25 will be opposite to that of the rollers 30 and this will further increase the tendency of the unit 20 to climb over the obstruction with a minimum resistance to continued forward movement with an action sometimes referred to in the art as "planing." The unit 20 possesses inherently and naturally through the medium of the belt 29 and somewhat resilient rollers 30 high resiliency and a built-in shock absorbing effect without the necessity for springs or other like separate instrumentalities to absorb shocks. The invention unit 20 is inherently a good shock absorber as well as a heavy load-bearing unit with excellent overload characteristics and a relatively large foot-print area and a very low unit ground contact pressure as compared to the usual pneumatic or solid tired wheel. The device has minimum resistance to rolling and is well adapted to exceptionally high unit loadings without excessive heat generation or wear.

In FIGURE 3, there is shown a modification of the invention wherein the same princniple or concept is employed in connection with a low level warehouse skid truck, pallet jack or the like, either powered or unpowered.

A platform body portion 36 of any suitable type has a plurality of preferably steel relatively small load-bearing rollers 37 journaled thereon and preferably lagged with rubber as indicated at 38. The rollers 37 are preferably arranged at the same elevation relative to the platform body portion, near the bottom thereof. Alternate reaction or flotation rollers 39 are provided intermediate and on opposite sides of the load-bearing rollers and the rollers 39 have no axles and are freely disposed relative to the body portion 36 and they may be formed of solid rubber or they may be air inflated as illustrated in FIGURE 3, or they may even be constructed of hollow plastic or steel tubing. A flexible load-bearing belt 40 of reinforced elastomer or the like has its top run trained over the relatively larger reaction rollers 39 and under the load-bearing rollers 37, as shown, while the bottom straight run 41 of the belt 40 is taut and engages beneath the inflated reaction rollers 39 which roll directly thereon.

The weight supported by the body portion 36 is borne directly by the top run of the belt 40 which sags between each pair of rollers 39, as shown, and supports the load-bearing rollers 37 at these points of sagging. The reaction rollers 39 engage the belt 40 around a major portion of their circumferences and exert a radial expansive reaction force against the belt in all radial directions encompassed by the areas of contact between the belt and reaction rollers. The freely disposed inflated rollers 39 may rise and fall to negotiate ground obstructions and they may further yield in the manner of any inflated or flexible body. The belt 40 is also capable of some yielding, and the device as a whole has excellent inherent shock absorbing qualities. One or more of the rollers 37 may be powered if preferred, and the unit shown in FIGURE 3 may be powered or unpowered, as stated. Other than as described, the FIGURE 3 invention unit has the same basic characteristics and advantages over the prior art as enumerated above in connection with the prior form of the invention.

Thus far in FIGURES 1–3, the invention has been described primarily in connection with certain specialized types of warehouse equipment and the like. The invention is also capable of a wide variety of load-carrying and moving or general vehicular applications which heretofore have employed either rubber tired wheels or conventional track devices with their inherent limitations as previously enumerated.

FIGURE 4 illustrates somewhat diagrammatically an invention unit 42 adapted to replace a conventional pneumatic tired wheel 43 of like size in a number of applications where the wheel 43 does not provide the ideal means for supporting and moving the load over rough terrain or where traction is poor or torque requirements through the wheel are objectionably high, etc. The unit 42 embodies a suitably powered load-bearing and drive roller 44, preferably lagged with rubber at 45 and suitably secured at 46 to the vehicle frame or other suspension means, not shown. The roller 44 may be powered or unpowered as the need requires. Reaction rollers 47 are provided beneath the roller 44 in generally the same manner described in connection with FIGURE 1 and the reaction rollers may be resilient steel tubing lagged on their outer surfaces with rubber or they may be inflated bodies formed of reinforced elastomer. A load-bearing belt 48 of metal or reinforced elastomer engages about the reaction rollers 47, as shown, and the sagging intermediate portion 49 of the upper run of the load belt is engaged by the load roller 44 between the end radial flanges 50 of the latter. A preferably all-elastomer replaceable tread belt 51 engages over the lower portion of the load belt 48 and around the outer sides of the reaction rollers and then passes upwardly and around the top side of a single tread belt snubbing roller 52 which may have rolling contact with the load roller 44, if desired. The construction shown in FIGURE 4 operates in generally the same manner and possesses the same attributes enumerated above in connection with FIGURE 1.

FIGURE 5 illustrates only a slight modification of the construction shown in FIGURE 4, wherein the identical load-bearing and reaction rollers 44 and 47 may be employed, together with the identical load-bearing belt 48 described in connection with FIGURE 4. In FIGURE 5, the replaceable tread belt 53 engages a pair of snubbing rollers 54 on opposite sides and near the top of the load roller 44 and preferably having rolling contact therewith. The snubbing rollers 54 are interconnected by a linkage arm 55 which may be pivoted at 56 to suitable vehicle frame structure. The mode of operation is substantially identical to that previously described in the prior forms of the invention.

The modifications of both FIGURES 4 and 5 provide an increased foot-print area with a resulting decreased ground contact pressure in contrast to pneumatic tired wheels of like size depicted in broken lines in FIGURES 4 and 5 for the purpose of comparison. The constructions in these figures are adapted to vehicles having conventional cantilevered axles which may receive the load-bearing rollers 44, as shown. These modifications of the invention are therefore adaptable to automotive vehicles and the like, whereas the modifications of FIGURES 1–3 are for specialized application as previously explained. In all cases, the load-bearing rollers may be powered or unpowered and the reaction rollers may be inflated or formed of metal tubing or the like. The load bearing belts may be metal or suitably reinforced elastomer. The surfaces of rollers which roll upon mating metal parts are preferably lagged with rubber, as stated. The modifications of FIGURES 4 and 5 have inherent walking beam effect without the usual complexities of conventional walking beam support structure, and these forms of the invention like all forms thereof are inherently shock-absorbing and resilient. The structures of FIGURES 4 and 5 are particularly well adapted to vehicles which are electrically driven because of the fact that the powered load-bearing rollers 44 are driven in the opposite direction to the rotation of the underlying reaction rollers.

FIGURES 6 and 7 illustrate a modification of the invention adaptable to vehicles which do not have cantilevered axles. In these figures, the numeral 57 designates a support bracket adapted to be rigidly secured to the vehicle main frame and depending therefrom. Journaled upon the bottom of the bracket 57 is the load-bearing roller 58, engaging the sagged upper run 59 of load-bearing belt 60. The replaceable tread belt 61 has its upper run spaced upwardly and engaging over a single snubbing roller 62 journaled upon and between the sides 63 of bracket 57. The two belts 60 and 61 engage relatively large inflated reaction rollers 64 having end walls 65 tied together by a tie rod 66 as shown in FIGURE 7. The tie rod 66 bears no load and merely serves to prevent excessive bulging of the end walls 65. The mode of operation of the FIGURES 6 and 7 construction is substantially the same as previously described. In this form of the invention, the belts 60 and 61 may both be formed of reinforced elastomer or the like. This construction is intended to replace the very large pneumatic tired walking beam carriages which are commonly employed in military cargo carriers and the like and wherein the power input apparatus has been greatly reduced and simplified along with the complicated walking beam structures, the latter being dispensed with entirely. Ground contact and inflation pressures are also reduced in comparison to prior art devices, and all of the advantages of the previously-described forms of the invention are achieved.

FIGURE 8 shows a further modification adaptable to internal combustion powered vehicles having cantilevered axles. In this form of the invention as indicated by the arrows, the load-bearing powered roller 67 and the reaction rollers 68 which are shown to be three in number rotate in the same direction. Intermediate load-bearing rollers 69 are provided, engaging an intermediate load-bearing belt 70 which is engaged at its upper run by the primary load-bearing roller 67, secured to the vehicle axle at 71. A main load-bearing belt 72 engages the three reaction rollers 68 as shown and also engages the bottom of the intermediate belt 70. The intermediate rollers 69 serve in the FIGURE 8 construction to impart to the reaction rollers 68 the same direction of rotation as the load-bearing roller 67, and as shown by the arrows, the rollers 69 turn oppositely to the rollers 67 and 68. The FIGURE 8 construction provides a unit which may be approximately ⅔ as high as the pneumatic tired wheel which it replaces, therefore eliminating the need for vehicle wheel wells. The unit is very well suited for internal combustion powered vehicles which are subject to very high unit loadings to be transported at moderate speeds.

In the FIGURE 8 construction, the vehicle load is transmitted directly through the load roller 67 to the secondary load belt 70 and rollers 69 and from the latter to the primary load-bearing belt 72 engaging the reaction rollers 68. The latter may be inflated rollers or tubing with some resiliency as previously explained in the prior forms of the invention. The rollers 69 may be inflated or non-inflated. The roller 67 is preferably a steel roller lagged with rubber. The load belts 70 and 72 may be metallic or suitably reinforced elastomer. A replaceable tread belt 73 is provided as in the prior forms of the invention and this belt is snubbed at its top by passing around the load roller 67 and is preferably spaced from the belt 70 so as not to rub the same. The unit of FIGURE 8 possesses the same advantages and features described previously in addition to the above-enumerated features. A very large foot-print area is provided with a very low ground contact pressure and double belt strength is provided at the ground contact area. The intermediate rollers 69 are preferably flanged at their ends as shown at 74 to aid in maintaining the various parts assembled. The FIGURE 8 unit is ideally suited for high loadings on small rolling diameters such as front wheels of fork lift trucks and the like. If the tread belt 73 is suitably reinforced with cords or the like, it may aid in transmitting torque since it has direct contact with the powered roller 67.

FIGURE 9 shows diagrammatically the appliction of the invention to a hand truck. In view of the previous description, it is believed that only a brief description of the FIGURE 9 modification is needed. In this figure, the numeral 75 designates a hand truck body carried by a support structure 76, rigid with an inverted U-shaped bracket 77. Journaled upon the bracket 77 is a load-bearing roller 78, in turn resting upon the upper run 79 of a combined load-bearing and traction belt 80. The separate replaceable traction belt disclosed in the prior forms of the invention may be omitted in the relatively light load application of FIGURE 9. The belt 80 engages about reaction rollers 81 which function in generally the same manner described previously in detail. The load on the truck body 75 is borne directly by the top run of the belt and the reaction rollers 81 react radially in all directions over the areas of contact with the belt and the weight is distributed over a wide ground contact area with low unit pressure and minimum resistance to rolling as in the prior forms of the invention.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A load suspension and transport means characterized by low resistance to rolling, light ground contact pressure and relatively large foot-print area, said means comprising a member for attachment to a vehicular load, a load-bearing roller journaled upon said member for rotation and carried bodily thereby, at least a pair of reaction rollers on opposite sides of the load-bearing roller and spaced therefrom, a flexible load-bearing belt engaging about said reaction rollers and having a top run engaging below the load-bearing roller and bearing the weight thereof and transmitting such weight to the reaction rollers, a flexible traction belt separate from the load-bearing belt engaging about the reaction rollers and the lower run of the load-bearing belt, and snubbing roller means for the upper run of the traction belt journaled on said member and maintaining the upper run of the traction belt separated from the load-bearing belt and load-bearing roller.

2. A load suspension and transporting means comprising a member for attachment to a load, load-bearing roller means journaled upon said member for rotation, plural reaction roller means spaced from the load-bearing roller means for rotation relative thereto, and flexible load-bearing traction belt means engaging and supporting the load-bearing roller means and also engaging the reaction roller means around substantial circumferential portions thereof and interconnecting the reaction roller means floatingly with the load-bearing roller means, said belt means constituting the only connection between the reaction roller means and said load bearing roller means and said member, whereby the reaction roller means may be displaced laterally of the load-bearing roller means.

3. A load-bearing transporting mechanism comprising bracket means for attachment to a load, a load-bearing roller journaled for rotation upon the bracket means, a pair of somewhat resilient reaction rollers spaced radially of the load-bearing roller on generally opposite sides of the axis thereof, an endless flexible load-bearing belt engaging about and spanning the reaction rollers and including an upper run engaging between the reaction rollers and load-bearing roller and bodily carrying the latter, and separate flexible traction belt means extending about the load-bearing and reaction rollers and the first-named belt and spaced from the upper run of the first-named belt and load-bearing roller.

4. A vehicular suspension means comprising a load-bearing roller adapted to be journaled for rotation upon a vehicle, a cooperating load-bearing endless flexible belt underlying said load-bearing roller and having a top run portion engaging the bottom of the load-bearing roller and carrying such roller, and at least a pair of spaced reaction rollers arranged upon opposite sides of the axis of the load-bearing roller and engaged over by said belt with the top run of the belt between the load-bearing and reaction rollers, said reaction rollers exerting a radial pressure against said belt at all circumferential points on the reaction rollers engaged with the belt, said belt engaging the reaction rollers around considerably more than one-half the circumference thereof and said belt being the sole connecting means between the reaction rollers, load bearing roller and vehicle.

5. A load suspension and transporting means comprising a low platform body portion adapted to receive a heavy warehouse container or the like, a plurality of spaced load-bearing rollers journaled for rotation upon the platform body portion at substantially the same elevation, alternately arranged reaction rollers on opposite sides of the load-bearing rollers and free from positive connection to the platform body portion, and an endless load-bearing traction belt surrounding and spanning all of said reaction rollers and including a top run having sagging portions underlying and bodily supporting the load-bearing rollers and maintaining the reaction rollers floatingly secured to the platform body portion and transmitting the weight of the load from the load-bearing rollers to circumferentially extensive upper portions of the reaction rollers, the bottoms of the reaction rollers rolling upon the bottom run of said belt.

6. The invention as defined in claim 5, and wherein the load-bearing and reaction rollers are uniformly sized and the reaction rollers are substantially larger in diameter than the load-bearing rollers.

7. The invention as defined in claim 6, and wherein the load-bearing rollers are substantially rigid rollers and the reaction rollers are inflated and resilient.

8. A vehicular load-bearing transporting and traction unit comprising a member for attachment to the vehicle, a primary load-bearing roller journaled upon said member, intermediate reaction rollers spaced from opposite sides of the axis of said primary roller, an intermediate endless flexible load-bearing belt engaging the intemediate rollers and having a top run engaging between the primary and intermediate rollers and bodily supporting the former, a plurality of primary reaction rollers below the intermediate rollers and arranged on opposite sides of the axes thereof, a primary load-bearing endless flexible belt engaging about the primary reaction rollers and underlying and engaging the bottom run of the intermediate belt and bearing the weight transmitted to the intermediate reaction rollers, the primary reaction rollers rollingly engaging the bottom run of the primary load-bearing belt, and a separate replaceable endless tread belt engaging about and surrounding all of said rollers and previously-named belts and maintained spaced by engagement with the top of the primary load-bearing roller from said intermediate rollers and belt.

9. A vehicular load-bearing transporting and traction unit comprising a member for connection with a stable vehicle structure, a load-bearing roller journaled upon said member for free rotation, underlying somewhat resilient reaction rollers spaced upon opposite sides of the axis of the load-bearing roller and being free floating relative to said vehicle structure, an endless flexible load-bearing belt engaging about the reaction rollers and between the latter and the load-bearing roller, a separate replaceable endless flexible traction belt engaging over the load-bearing belt and underlying it, and snubbing roller means for the traction belt near the top of the load-bearing roller and journaled on the member and holding the upper portion of the traction belt spaced from the load-bearing roller and from the upper run of the load-bearing belt.

10. The invention as defined in claim 9, and wherein said reaction rollers are resilient inflated rollers and said load-bearing roller is substantially rigid.

11. A unit for bearing and transporting extremely heavy concentrated loads with minimum resistance to rolling and relatively low ground contact pressure, said unit comprising a substantially rigid member for direct connection to the load, a substantially rigid load-bearing roller journaled for rotation upon said member, a pair of reaction rollers of substantially equal diameter and larger diameter than the load-bearing roller arranged parallel to the load-bearing roller on opposite sides thereof and spaced therefrom, a high tensile strength endless flexible load-bearing belt engaging said reaction rollers and having a top run engaging between the reaction rollers and load-bearing roller and adapted to sag between the reaction rollers and bodily carry the load-bearing roller, readily replaceable elastomer tread belt separate from the load-bearing belt and overlying the same, and a pair of spaced parallel snubbing rollers journaled upon said member near the tops of the load-bearing and reaction rollers and underlying the top run of said tread belt and holding the latter taut and spaced above the load-bearing roller and the top run of the load-bearing belt.

12. The invention as defined in claim 11, and wherein the load-bearing roller is a metal roller lagged with elastomer, said reaction rollers are tubular relatively thin-walled rollers having inherent springiness and being lagged with elastomer, and said load-bearing belt is a metallic belt.

13. A load bearing and transporting unit comprising a carrier member for attachment to the load, a load bearing roller rotatably mounted upon the carrier member, a pair of reaction rollers spaced generally from opposite sides of the axis of the load-bearing roller, endless flexible means engaging over the reaction rollers and between the reaction rollers and the load-bearing roller and bearing the weight of the latter and transmitting such weight to the reaction rollers around substantially circumferential portions thereof, and an endless flexible tread element applied over said endless flexible means and separate therefrom, and snubbing means for said tread element to maintain the same separated from the load-bearing roller and connected with said carrier member.

14. The invention as defined by claim 13, and wherein said reaction rollers are tubular and resilient.

15. The invention as defined by claim 13, and wherein said reaction rollers are inflated resilient rollers.

16. The invention as defined by claim 13, and wherein the load-bearing roller is substantially rigid and the reaction rollers are resilient.

References Cited in the file of this patent

UNITED STATES PATENTS

| | | |
|---|---|---|
| Re. 24,272 | Albee | Feb. 12, 1957 |
| 1,450,643 | Platt | Apr. 3, 1923 |
| 1,705,980 | Knox et al. | Mar. 19, 1929 |
| 2,556,270 | Groeller | June 12, 1951 |
| 2,782,076 | Miller | Feb. 19, 1957 |
| 3,050,347 | Levi | Aug. 21, 1962 |